Dec. 28, 1954  J. J. BLASINGAME ET AL  2,698,432
TEST PULSE SIGNAL GENERATOR
Filed Oct. 29, 1952  2 Sheets-Sheet 1
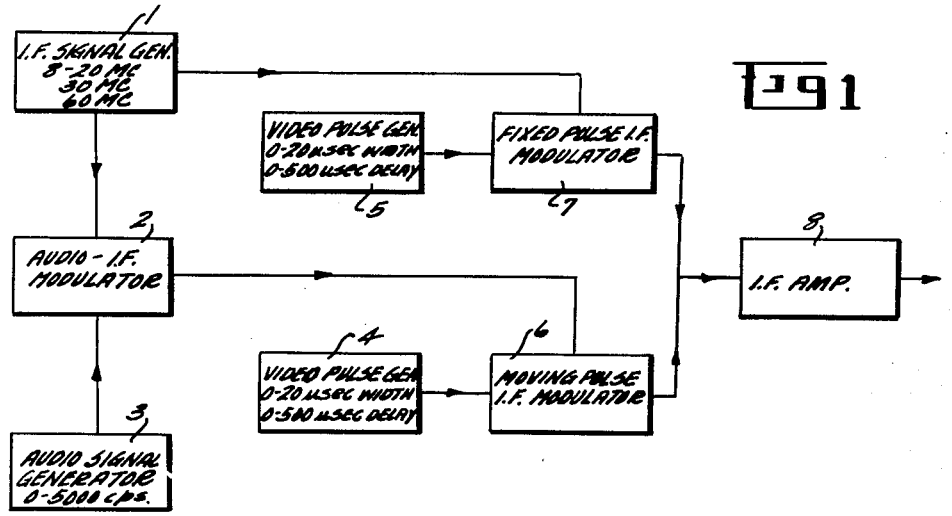
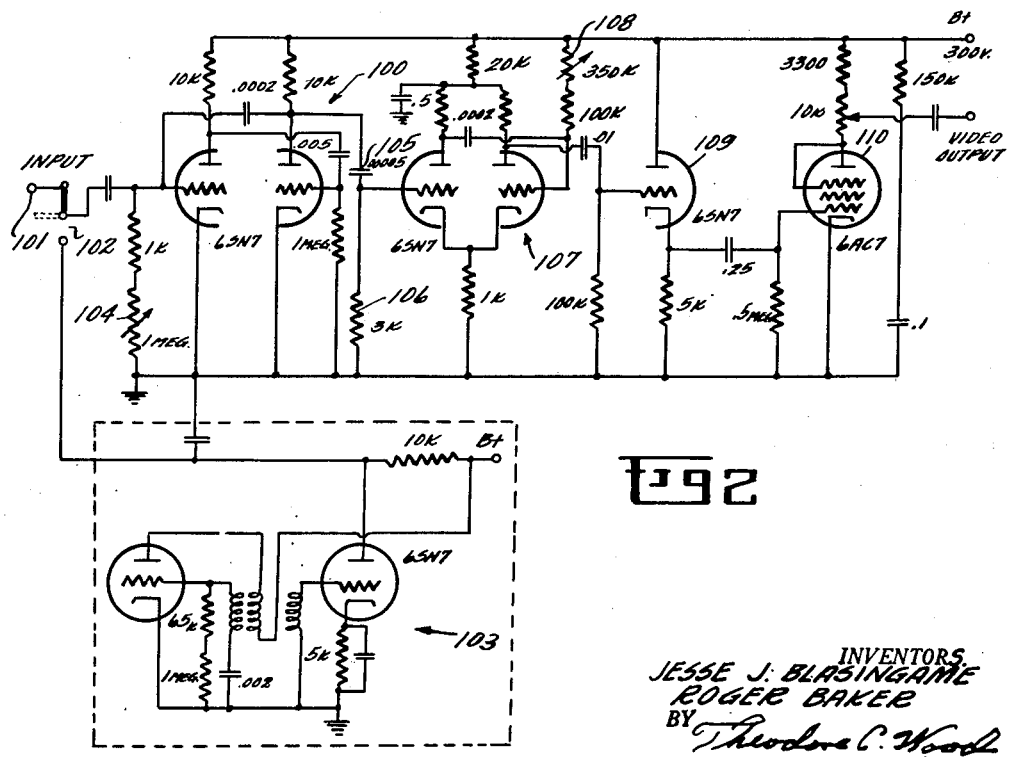
INVENTORS
JESSE J. BLASINGAME
ROGER BAKER
BY Theodore C. Wood
AGENT
Wade Knoutz
ATTORNEY Dec. 28, 1954 J. J. BLASINGAME ET AL 2,698,432
TEST PULSE SIGNAL GENERATOR
Filed Oct. 29, 1952 2 Sheets-Sheet 2
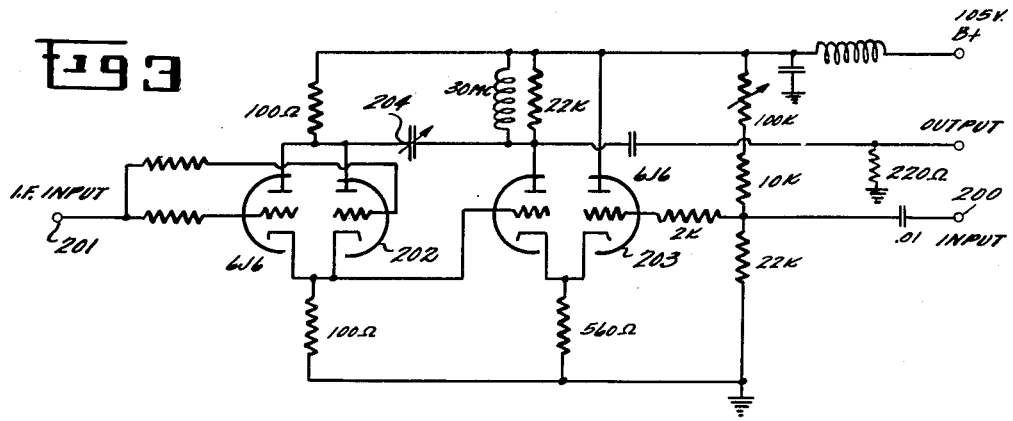
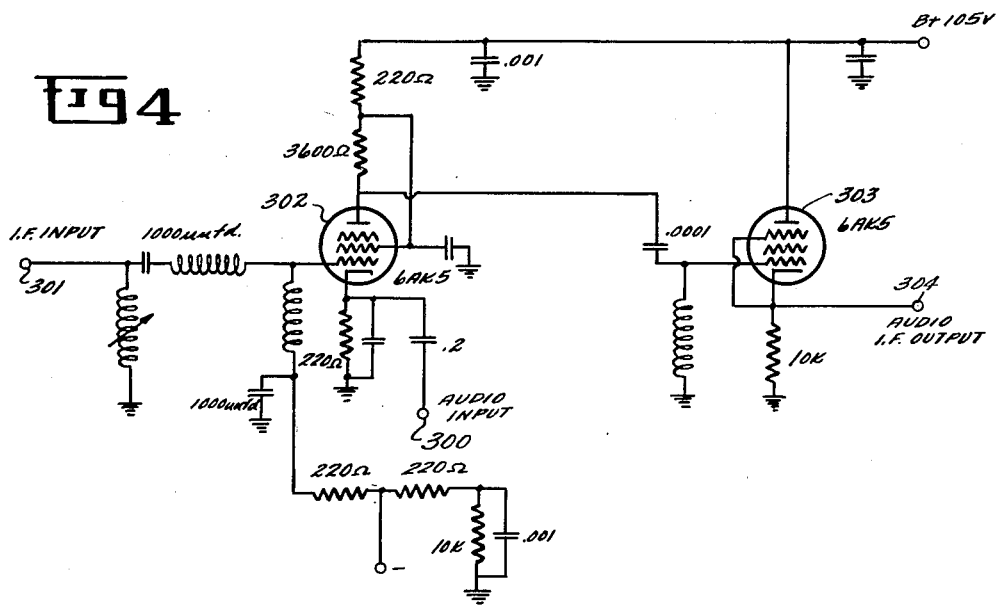
INVENTORS.
JESSE J. BLASINGAME
ROGER BAKER

United States Patent Office 2,698,432
Patented Dec. 28, 1954

2,698,432

TEST PULSE SIGNAL GENERATOR

Jesse J. Blasingame, Fairborn, and Roger Baker, Springfield, Ohio

Application October 29, 1952, Serial No. 317,602

2 Claims. (Cl. 343—17.7)

(Granted under Title 35, U. S. Code (1952), sec. 266)

The invention described herein may be manufactured and used by or for the Government for governmental purposes without payment to us of any royalty thereon.

This invention relates to electronic test equipment and more particularly to a signal generator which will produce video signals representative of radar signals such as those received from an object fixed in distance from the transmitter and receiver as well as video signals representative of radar signals such as those received from an object whose distance from the transmitter and receiver varies in time.

In the art of radar systems of the type known as the "moving target indicator" type, it is oftentimes necessary or desirable to test the operability of the receiving apparatus so that it may be adjusted for optimum operation.

It is an object of this invention to provide a signal generator which may be used for testing the operating characteristics of a "moving target indicator" type of radar receiver.

It is a further object of this invention to provide a signal generator which will produce a first series of pulses spaced in time and a second series of pulses spaced in time wherein the first series of pulses have equal amplitude and the second series of pulses differ one from another in amplitude.

It is a still further object of this invention to provide a signal generator of the synchronized type which will produce a first series of pulses comprising pulses of equal amplitude and spaced in time by a variable amount from the synchronizing signals and which will further produce a second series of pulses comprising pulses having different amplitude from one another and spaced in time by a variable amount from the synchronizing signals.

The above objects as well as other objects, features and advantages of the apparatus of this invention will be more thoroughly understood in view of the following description when taken in conjunction with the drawings wherein:

Fig. 1 is a block diagram of a signal generator constructed in accordance with the principles of this invention.

Fig. 2 is a simplified schematic diagram of the video pulse generators indicated in block form in Fig. 1.

Fig. 3 is a simplified schematic diagram of the pulse I. F. modulators indicated in block form in Fig. 1.

Fig. 4 is a simplified schematic diagram of the audio I. F. modulator indicated in block form in Fig. 1.

Referring now to Fig. 1, the I. F. signal generator 1 produces a signal having a frequency equal to I. F. frequency of the receiver to be tested. The I. F. signal is modulated in modulator 2 by an audio frequency signal from the audio signal generator 3.

A video pulse generator 4 produces a series of video pulses whose pulse width may be varied at will, whose repetition rate is determined either by synchronizing signals from the radar system to be tested or from a separate source of synchronizing signals produced by apparatus which is preferably built in as a part of the test equipment, and those video pulses are delayed in time from the synchronizing signals by an adjustable amount.

Another video pulse generator 5 also produces a series of pulses whose pulse width may be varied at will, whose repetition rate is determined either by synchronizing signals from the radar system to be tested or from a separate source of synchronizing signals produced by apparatus which is preferably built-in as a part of the test equipment, and those video pulses are delayed in time from the synchronizing signals by an adjustable amount. The audio modulated I. F. signals in the output of the modulator 2 and the video pulses from the output of the video pulse generator 4 are mixed together in modulator 6 and the output of that modulator 6 is a series of video pulses differing one from the other in amplitude and as such is representative of radar pulses received from a moving target.

The I. F. signal from the I. F. signal generator 1 and the video pulses from the video pulse generator 5 are mixed together in modulator 7 whose output is a series of video pulses each having substantially the same amplitude and as such are representative of radio signals received from a target which is fixed in range from the radar apparatus. Since the pulses in the output of the modulator 7 and the output of the modulator 6 may be of such a low amplitude that they are not satisfactory for feeding directly into the receiver being tested, those signals may be first amplified by a suitable I. F. amplifier 8.

The details of the video pulse generators 4 and 5 are shown in Fig. 2, reference being made thereto. The circuit generally indicated at 100 is a multivibrator circuit which may be of conventional form and is triggered either by negative synchronizing signals applied to terminal 101 which may be signals from the radar system being tested or, when the switch 102 is in the opposite position to that shown in the drawing, synchronizing signals are applied from a separate synchronizing pulse generator indicated generally as 103. The pulse duration of the circuit 100 is determined in part by resistor 104 which is a variable resistance and therefore the pulse duration of that circuit may be made any desirable amount. The output of the circuit 100 is differentiated by capacitor 105 and resistor 106 resulting in a negative pulse which is coincident in time with the leading edge of the pulse produced by the circuit 100 and a positive pulse which is coincident in time with the trailing edge of the pulse produced by the circuit 100. Since the time duration of the pulse produced by the circuit 100 can be varied, the time of occurrence of the positive pulse resulting from the differentiation will also be varied accordingly. That positive pulse is used to trigger on a second multivibrator circuit 107 which has one stable condition of operation. The pulse duration of the circuit 107 is determined in part by the variable resistor 108 and therefore the pulse width of the pulse produced by circuit 107 may be made to have any desired value. This output pulse is then amplified by tubes 109 and 110 which together with their associated circuits form conventional amplifiers.

The video pulse generators 4 and 5 in Fig. 1 may and preferably are identical in construction and may take the form shown in Fig. 2. It will be understood, however, that only one synchronizing pulse generator such as that shown in Fig. 2, and referred to by reference numeral 103, will be required for the two video pulse generators.

The pulse-I. F. modulators 6 and 7 of Fig. 1 are shown in detail in Fig. 3, reference being made thereto. The video pulse, either from the video pulse generator 4 or from the video pulse generator 5, is applied to input terminal 200. The I. F. signal, either from the output of modulator 2 or from the I. F. signal generator 1, is applied to input terminal 201. The tubes 202 and 203 together with their associated circuits form a conventional modulator circuit except possibly for the inclusion of capacitor 204 which is a neutralizing condenser and will prevent any output from the modulator during the time between pulses. If the condenser is not provided, it is possible that an output would be produced between pulses, due to the grid of plate capacity of the tubes 202 and 203.

The details of the audio-I. F. modulator 2 of Fig. 1 are shown in Fig. 4, reference being made thereto. The audio signal from the audio signal generator 3 is applied to the input terminal 300 and the I. F. signal from the I. F. signal generator 1 is applied to the input terminal 301. Tube 302 and its associated circuit form a conventional modulator circuit and the output from that circuit is applied to the control grid of tube 303 which together with its associated circuit form a conventional cathode follower and therefore the audio modulated I. F. signal will appear at output terminal 304.

The operation of the apparatus of this invention will be more or less obvious, however, it is pointed out that by including the resistor 104 in each of the video pulse generators, independent and variable time delay is provided thus allowing the occurrence of the video pulses at any desired time after the occurrence of the synchronizing pulses. By the inclusion of the resistor 108 in each of the video pulse generators the width of the pulses in the output of the apparatus may be made any desired value and therefore when the output of this test apparatus is applied to the circuits of the radar receiver to be tested the two series of pulses are allowed to be seen on the receiver oscilloscope at the same or different time and may be moved to any desired time of occurrence on the sweep. An advantage of controlling the pulse width is that a wider pulse is easier to find when presented on an oscilloscope and after having once been found the pulse width can then be reduced to correspond to that used in the transmission from the radar set being tested.

Although particular circuits have been illustrated and described in order that the invention may be more fully understood, it will be understood that those circuits are merely examples and many changes may be made to those circuits without departing from the scope of this invention.

What is claimed is:

1. A signal generator for use in testing a moving target indicator type of radar equipment comprising means for producing an intermediate frequency signal of substantially constant amplitude and an intermediate frequency signal having its amplitude varied at a rate substantially lower than said intermediate frequency, means providing a series of synchronizing pulses, means to produce a first series of trigger pulses, each trigger pulse occurring an adjustable time after a corresponding pulse of said series of synchronizing pulses, means to produce a first series of video pulses each pulse of said first series of video pulses being initiated by a corresponding pulse of said first series of trigger pulses, means to modulate said intermediate frequency signal having its amplitude varied at a rate substantially lower than said intermediate frequency by said first series of video pulses whereby a series of intermediate frequency pulses having different amplitudes one from the other are produced, means to produce a second series of trigger pulses, each trigger pulse occurring an adjustable time after a corresponding pulse of said series of synchronizing pulses, means to produce a second series of video pulses, each pulse of said second series of video pulses being initiated by a corresponding pulse of said second series of trigger pulses, means to modulate said intermediate frequency signal of substantially constant amplitude by said second series of video pulses whereby a series of intermediate frequency pulses are produced having substantially equal amplitudes, and means to apply to the radar equipment to be tested said series of intermediate frequency pulses having different amplitudes one from the other and said intermediate frequency pulses having substantially equal amplitudes.

2. A signal generator for use in testing a moving target indicator type of radar equipment comprising means for producing an intermediate frequency signal of substantially constant amplitude, means to produce an intermediate frequency signal having its amplitude varied at a rate substantially lower than said intermediate frequency, a first multivibrator circuit having means to adjust the width of its output pulse, a first differentiator circuit connected to the output of said first multivibrator circuit to thereby produce a trigger pulse coincident in time with the trailing edge of the output pulse from said first multivibrator circuit, a second multivibrator circuit having one stable condition of operation, means to apply said trigger pulse from said first differentiator circuit to the input of said second multivibrator circuit whereby said second multivibrator circuit will be caused to operate in its unstable condition, means to adjust said second multivibrator circuit whereby the length of time in which it remains in its unstabled condition may be varied, a third multivibrator circuit having means to adjust the width of its output pulse, a second differentiator circuit connected to the output of said third multivibrator circuit to thereby produce a trigger pulse coincident in time with the trailing edge of the output pulse from said third multivibrator circuit, a fourth multivibrator circuit having one stable condition of operation, means to apply said trigger pulse from said second differentiator circuit to the input of said fourth multivibrator circuit, means to adjust the time in which said fourth multivibrator circuit will remain in its unstable condition, means to modulate said intermediate frequency signal of substantially constant amplitude by said output of said fourth multivibrator circuit whereby a series of intermediate frequency pulses are produced having substantially equal amplitudes, means to modulate said intermediate frequency signal having its amplitude varied at a rate substantially lower than said intermediate frequency by said output pulses from said second multivibrator circuit whereby a series of intermediate frequency pulses having different amplitudes one from the other are produced, and means to apply to the radar equipment to be tested said series of intermediate frequency pulses having different amplitudes one from the other and said intermediate frequency pulses having substantially equal amplitudes.

References Cited in the file of this patent

UNITED STATES PATENTS

| Number | Name | Date |
| --- | --- | --- |
| 2,440,261 | Ginzton | Apr. 27, 1948 |
| 2,624,872 | Emmett | Jan. 6, 1953 |

OTHER REFERENCES

Beck, "Testing Repeaters with Circulated Pulses," February 1947, 5 pages. (Copy in Div. 70.)